United States Patent [19]

Birchall et al.

[11] Patent Number: 5,236,599
[45] Date of Patent: Aug. 17, 1993

[54] WATER TREATMENT PROCESS

[75] Inventors: James D. Birchall, Chester; Michael J. Walker, Northwich, both of England

[73] Assignee: Imperial Chemical Industries PLC, London, England

[21] Appl. No.: 892,676

[22] Filed: Jun. 4, 1992

Related U.S. Application Data

[63] Continuation of Ser. No. 538,326, Jun. 14, 1990, abandoned.

[30] Foreign Application Priority Data

Jun. 14, 1989 [GB] United Kingdom ............... 8913643
Jul. 31, 1989 [GB] United Kingdom ............... 8917495

[51] Int. Cl.$^5$ .............................................. C02F 1/52
[52] U.S. Cl. .................................. 210/724; 210/728; 210/747; 210/749; 210/911
[58] Field of Search .............. 210/702, 716, 717, 723, 210/724, 726, 719, 757, 911, 751, 747, 728, 749

[56] References Cited

U.S. PATENT DOCUMENTS

| 4,404,105 | 9/1983 | Rysman de Lockerente et al. | 210/710 |
| 4,664,809 | 5/1987 | Fenton et al. | 210/663 |
| 4,822,579 | 4/1989 | Wagner | 210/198.1 |

FOREIGN PATENT DOCUMENTS

| 886130 | 8/1953 | Fed. Rep. of Germany. | |
| 53-16358 | 2/1978 | Japan | 210/726 |
| 53-108658 | 9/1978 | Japan | 210/726 |
| 806622 | 2/1981 | U.S.S.R. | 210/724 |
| 850606 | 8/1981 | U.S.S.R. | 210/724 |

OTHER PUBLICATIONS

Willey, "Reactions Which Remove Dissolved Alumina from Sea Water", Chemical Abstracts, Jul. 12, 1976, vol. 85 No. 2, p. 305, Abstract No. 10120h.

Neal et al., "Towards Establishing Aluminum Hydroxy Silicate Solubility Relationships for Natural Waters", Chemical Abstracts, May 2, 1988, vol. 108, No. 18, p. 361, Abstract No. 156029a.

Primary Examiner—Peter Hruskoci
Attorney, Agent, or Firm—Cushman, Darby & Cushman

[57] ABSTRACT

Acid water containing toxic levels (>0.1 ppm) of aluminum is treated to dissolve therein both silicate ions in an amount to create a solution containing at least 40, preferably at least 100, micromoles per liter of silicon and a silicon:aluminum ratio (based on metals) of at least about 6:1 and preferably 10:1 in the water to form a non-toxic complex with aluminum and alkali or alkali metal ions to increase the pH of the water. The preferred treatment agent is a hydraulic calcium silicate, in the form of cement clinker, optionally silicate-enriched with a soluble silicate.

10 Claims, No Drawings

WATER TREATMENT PROCESS

This is a continuation of application Ser. No. 07/538,326, filed on Jun. 14, 1990, which was abandoned upon the filing hereof.

This invention relates to a process for the treatment of water and particularly the treatment of acidic water to improve its environmental and potable acceptability.

Acidic waters, such as are obtained for example by the collection of so-called acid rain, contain dissolved aluminium at levels known to be harmful to fish in lakes and rivers and considered by some authorities to be deleterious to roots such as tree roots. It is known also that the presence of dissolved (labile) aluminium in the water used in renal dialysis is dangerous to patients who may develop neurological disorders and bone pathology.

Aluminium is essentially insoluble in neutral or alkaline water but its solubility increases as the acidity of water increases (the pH of the water decreases). At pH 6 or below aluminium is soluble to toxic levels and its presence in acidic waters may result for example from contact of the water with aluminium-bearing rocks and soils or from the use of aluminium salts such as alum as a flocculent in water treatment systems.

It is known that the deleterious effect of aluminium on fish and trees can be minimised by decreasing the acidity (increasing the pH) of acidic water, whereby the solubility of aluminium in the water is decreased. Thus in the treatment of acidic lakes, rivers and streams and the catchment areas that feed them, it is common practice to treat the water with an alkali such as an alkali or alkaline earth metal carbonate. Alkalis containing calcium are preferred to those containing alkali metals since it is thought that calcium ions have a beneficial effect in increasing the tolerance of fish to impurities in the water. The alkali most commonly employed is calcium carbonate in the form of limestone.

Aluminium dissolved in water can be rendered non-toxic by treatment of the water with silicon (in the form of silicic acid) in an amount sufficient to create a large excess of silicon with respect to aluminium and hence the deleterious effect of aluminium on the environment is reduced. Detoxification of water with silicon is greater than is obtained by treatment of the water with alkali alone and is not dependent upon increasing the pH of the water. However, it is preferred that the pH of the water is increased while silicon (or silicic acid) is dissolved in the water.

According to the present invention there is provided a process for the detoxification of waters containing dissolved aluminium which comprises dissolving in the water a source of silicon (silicic acid) and a source of alkali in amounts such that the water contains at least 40 micromoles per liter of dissolved silicon and the ratio of silicon to aluminium in the water is greater than about 6:1 and preferably greater than 10:1. The amount of the source of silicon is preferably such that the water contains at least 100 micromoles per liter of dissolved silicon.

Separate sources may be employed for the silicon and the alkali or if desired a common source of silicon and alkali may be employed. Examples of sources of silicon which may be used are alkali metal silicates and alkaline earth metal silicates. Slow-dissolving or very slow-dissolving sources such as sand, quartz and some clays may be used in some cases. Examples of sources of alkali which may be employed are lime, hydrated lime, quicklime, limestone, chalk and whiting.

Mixtures of one or more sources of silicon with one or more sources of alkali may be employed, as may a common source of silicon and alkali together with a separate source of silicon, for example in cases where it is desired to increase the concentration of silicon relative to alkali in the water to a level not attainable from the common source alone. A specific example of a mixture for use in the invention is a mixture of lime and/or limestone with an alkali metal silicate.

Preferably at least some of the silicon and the alkali are provided by the same source which may be, for example, an alkali metal silicate or an alkaline earth metal silicate. Hydraulic calcium silicates are the preferred treatment agents and are readily available in the form of calcium silicate hydraulic cement clinkers which are cement phases comprising di-and tri-calcium silicates, $2CaO.SiO_2$ and $3CaO.SiO_2$. Portland cements which contain a substantial proportion of hydraulic calcium silicate may also be used; such cements often also contain calcium aluminates which are undesirable in that they may provide additional aluminium dissolved in the water but this additional dissolved aluminium can be tolerated provided the water contains at least 40 and preferably at least 100 micromoles per liter of silicon.

The dissolution of silicon (silicic acid) in acidic waters of pH 5.5 and above containing dissolved aluminium results in the formation of complex aluminosilicate species which in general are non-toxic.

As stated, the silicon:aluminium ratio in the water should be at least 6:1 and preferably is at least 10:1. and the silicon content of the water should be at least 40 and preferably at least 100 micromoles per liter. When using cement clinker as the source of silicon (and of alkali to increase the pH of the water), aluminium is also added to the water since cement clinkers are calcium aluminosilicates. Cement clinkers typically contain a silicon:aluminium ratio of about 3.45:1 although up to about 7:1 is possible with some clinkers. Therefore, using a typical cement clinker (ratio 3.45:1) may not provide sufficient silicon in the water to detoxify the total aluminium (including that added from the clinker) in the water. It is therefore desirable to add additional silicon to the cement clinker in the form of a soluble silicate such as an alkali metal silicate or an alkaline earth metal silicate. The additional silicate may be incorporated in the cement clinker to provide a silicon-enriched powder, or it may be dosed separately into the water being treated.

The dissolution of sufficient silicon (silicic acid) in acidic waters of pH 5.5 and above is believed to result in the formation of complex aluminosilicate species which are intermediates in the formation of the insoluble aluminosilicate imogolite. These intermediates may remain in solution for prolonged periods but may eventually precipitate out as colloidal solids. Residual aluminium in the water may therefore be high, but the toxic form of aluminium can be very low, for example as low as 1 microgram per liter. Any complex aluminosilicate species precipitated as colloidal solids can if desired be removed but they are of low biological availability compared with aluminium hydroxide and may be allowed to remain in the water and slowly settle out.

In treating water with hydraulic calcium silicates such as cement clinker it is important to ensure that the pH of the water in contact with the silicates is and remains below about 9.0 in order to prevent the formation of a cement at the expense of dissolution of the silicates. If the pH of the water is allowed to rise to above about 10.0, a setting reaction takes place in the silicates and a cement is formed; however if the pH remains below about 9.0, the setting reaction is inhibited and slow dissolution of the silicates occurs. Thus if a small amount of water is mixed with hydraulic calcium silicates the pH of the water rises rapidly to about 12.0, a setting reaction occurs so that a cement is formed and very little silica, say 1 ppm, becomes dissolved in the water. However, in the presence of large volumes of water, say 200:1 or greater water:solid mass ratio, the pH remains below 9.0, the setting reaction is inhibited and appreciable amounts of silica dissolve in the water. For example at pH 6.0 the amount of dissolved silica can be as high as 130–150 ppm.

Therefore in order to achieve dissolution of the calcium silicates rather than cement formation, the pH of the water in proximity to the calcium silicates should be maintained below about 9.0. This can be achieved by ensuring a large excess of water (although too much water will result in dilution of the solution so that the desired minimum of 40 micromoles of silicon per liter of water is not achieved) and/or by ensuring the absence of static layers adjacent to the silicates by agitation and/or by passing the water through a bed of the silicates. In the case of fast-flowing streams of water, large granules of silicates may be used while smaller particles should be used in the case of slower moving streams. A useful technique for treating lakes where the water is static or essentially static and agitation may be impractical or inappropriate, is to spray or otherwise spread the silicates in the form of a fine powder onto the surface of the water and allow it to sink slowly through the water.

A silicate formulation containing a setting-inhibiting additive may be necessary for the treatment of water in environments where the creation of static water layers on the silicates cannot be prevented, for example in the treatment of acidic soils where there is no excess of water and essentially no flow of water. Such formulations are prevented from setting and ensure the dissolution of the silicates at higher pH values than can be allowed in the case of unformulated hydraulic calcium silicates. Indeed the use of such formulations can be irrespective of the (local) pH of the water being treated.

Suitable additives for preventing or inhibiting the setting of hydraulic calcium silicates include, for example, sugars such as sucrose and raffinose. To prepare the formulations, finely divided hydraulic silicates are mixed with a solution of the sugar and the resulting hardened product is ground to an appropriate particle size.

As stated hereinbefore, the present invention affords a method of treating waters containing dissolved aluminium which reduces the levels of toxic aluminium to as low as 1 microgram per liter by complexing the aluminium with dissolved silicon (silicic acid) while increasing the pH (decreasing the acidity) of the water by adding an alkali.

By way of illustration of the effect of the pH of the water in contact with hydraulic calcium silicates and the need to avoid setting reactions leading to cement formation, Table 1 below shows the amount of dissolved silicon (as silica) measured in water treated at various pH values:

TABLE 1

| pH of water | Dissolved silica - ppm |
| --- | --- |
| 8 | 130 |
| 10 | 65 |
| 11.5 | 20 |
| 12.5 | 1 to 5 |

By way of further illustration of the need to avoid setting reactions leading to cement formation, Table 2 shows the ratio of calcium:silica measured in waters treated on the one hand with unprotected hydraulic calcium silicates and on the other hand with the same hydraulic calcium silicates formulated with sucrose as hereinbefore described.

TABLE 2

| Time (mins) | Ca:Si Ratio in Solution | |
| --- | --- | --- |
| | Silicates | Silicates and Sucrose |
| 1 | 1000 | 114 |
| 5 | 1000 | 93 |
| 10 | 1000 | 90 |
| 30 | 1000 | 19 |
| 70 | 1000 | 10 |
| 120 | 1000 | 8.5 |
| 210 | 1000 | 6.2 |
| 300 | 1000 | 5.9 |

The invention is illustrated by the following examples.

EXAMPLE 1

Samples of cement clinker of particle size below 1.18 mm were placed in a 2.5 ml/minute flow of water acidified to pH 3.0 with hydrochloric acid. Water was collected over a period of 100 minutes in order to provide sufficient material for analysis for pH, dissolved silicon (analysed as silica) and silicon/aluminium ratio. Results were obtained for sample quantities of 1, 2, 3 and 4 g of cement clinker and are shown below:

| Sample | pH of treated water | $SiO_2$ $\mu M/l$ | Si/Al |
| --- | --- | --- | --- |
| 1 g | 10.8 | 135.6 | 18 |
| 2 g | 10.9 | 455.1 | 30 |
| 3 g | 11.5 | 503.5 | 39 |
| 4 g | 11.2 | 406.7 | 60 |

The results show that in all the tests cement clinker dissolves in acid water to decrease the acidity (increase the pH) of the water, provide a high level of dissolved silicon ($SiO_2$) and provide a Si/Al ratio significantly in excess of 10.

EXAMPLES 2

A sample of Ordinary Portland cement ground to a specific surface area of 350 $m^2$/kg was evaluated in the acidified water flow test described in example 1. The results were are follows:

| Sample | pH of treated water | $SiO_2$ $\mu M/l$ | Si/Al |
| --- | --- | --- | --- |
| 1 g | 10.8 | 125.9 | 11 |
| 2 g | 11.2 | 145.3 | 13 |
| 3 g | 10.1 | 125.9 | 15 |
| 4 g | 11.0 | 164.6 | 12 |

The results show that the cement dissolves so that pH is increased and high silica levels and Si/Al ratios are obtained.

EXAMPLES 3

A dry mixture of ordinary Portland cement as used in example 2 and 1% sucrose by weight was wetted and mixed and allowed to set. The resulting solid was ground to a coarse powder and subjected to the acid water flow test described in example 1. Results were:

| Sample | pH of treated water | $SiO_2$ $\mu M/l$ | Si/Al |
| --- | --- | --- | --- |
| 1 g | 3.6 | 52.2 | 15 |
| 5 g | 12.2 | 606.5 | 37 |
| 10 g | 12.3 | 334.8 | 16 |

EXAMPLE 4

A mixture of 30% w/w quicklime of particle size 90% less than 75 $\mu m$ (ICI Grade SG90) was mixed with dried Gault clay and wetted so as to allow the formation of extruded pellets of about 3 mm diameter. These pellets were fired briefly at 1000° C. to overcome the problems of physical instability in water, and subjected to the acid water flow test described in example 1. Results were:

| Sample | pH of treated water | $SiO_2$ $\mu M/l$ | Si/Al |
| --- | --- | --- | --- |
| 1 g | 3.0 | 32.7 | 5 |
| 5 g | 10.7 | 336.5 | 12 |
| 10 g | 11.7 | 471.1 | 18 |

EXAMPLE 5

In a similar manner to example 4, a 30% w/w quicklime/talc mixture was made and subjected to the flow test. This product contained less aluminium in the clay and as expected produced an improvement in Si/Al ratio. Results were:

| Sample | pH of treated water | $SiO_2$ $\mu M/l$ | Si/Al |
| --- | --- | --- | --- |
| 1 g | 2.8 | 60.4 | 211 |
| 5 g | 7.0 | 110.4 | 123 |
| 10 g | 9.7 | 364.6 | 255 |

EXAMPLE 6

In a similar manner to examples 4 and 5, a 30% w/w quicklime/kieselguhr mixture was made and tested in the flow test with acidified water. Results were:

| Sample | pH of treated water | $SiO_2$ $\mu M/l$ | Si/Al |
| --- | --- | --- | --- |
| 1 g | 3.4 | 43.8 | 56 |
| 5 g | 10.5 | 93.8 | 56 |
| 10 g | 10.5 | 104.2 | 77 |

Results for dissolved silica are marginal against a target of 100 $\mu M/l$ but as expected with a low aluminium product, the Si/Al ratio is high.

EXAMPLE 7

Dry mixes of crushed limestone, sodium silicate powder and ordinary Portland cement were made, mixed with water to form a paste and allowed to harden overnight. The samples were crushed to a coarse powder (less than 1.4 mm) and subjected to the flow test described in example 1. Results were:

| Sample w/w Limestone/silicate/cement | Sample Size | pH of treated water | $SiO_2$ $\mu M/l$ | Si/Al |
| --- | --- | --- | --- | --- |
| 75/10/15 | 5 g | 12.5 | 255.6 | 9 |
| 85/10/5 | 5 g | 12.0 | 6655.4 | 1322 |

EXAMPLE 8

Fish toxicity studies were carried out using A-cement, B-cement/sucrose, C-lime/clay and D-lime/talc.

The various compounds A to D were added to water containing 20 $\mu M$/liter aluminium, in a quantity to provide an estimated 500 $\mu M$/liter of dissolved silicon. These water samples were compared with controls containing E-20 $\mu M$/liter aluminium alone, F-500 $\mu M$/liter sodium silicate, G-a similar solution ion exchanged to replace the sodium ions by hydrogen ions and H/I-silicate solutions of both types with 20 $\mu M$/liter of aluminium. All the water samples were adjusted to pH5 with nitric acid.

3 tanks of 10 liters of each sample of water were prepared and allowed to equilibrate for 24 hours before the introduction to each tank of 20 brown trout fry (0.5–1.0 g) previously starved for 2 days and acclimatised in pH5 water for 24 hours. The cumulative mortality results over a period of 24 hours were as follows:

| Treatment | Deaths in time period* Time (hours) | | | | | | | |
| --- | --- | --- | --- | --- | --- | --- | --- | --- |
| | 3 | 6 | 9 | 12 | 15 | 18 | 21 | 24 |
| A | 0 | 0 | 0 | 0 | 0 | 0 | 2 | 2 |
| B | 0 | 0 | 0 | 0 | 0 | 1 | 2 | 3 |
| C | 0 | 0 | 0 | 0 | 0 | 0 | 0 | 1 |
| D | 0 | 0 | 0 | 0 | 0 | 1 | 1 | 1 |
| Comparative Examples | | | | | | | | |
| E | 0 | 0 | 1 | 2 | 6 | 7 | 14 | 20 |
| F | 0 | 0 | 0 | 0 | 0 | 2 | 3 | 3 |
| G | 0 | 0 | 0 | 0 | 0 | 0 | 1 | 2 |
| H | 0 | 0 | 0 | 0 | 0 | 1 | 1 | 1 |
| I | 0 | 0 | 0 | 0 | 0 | 0 | 1 | 1 |

*Figures quoted are the mean of three tests.

Control tests using untreated water of pH5 resulted in 1 to 3 fish deaths over a 24 hour period.

Water chemistry before and after exposure of the fish was established and the results are shown below. All samples were filtered through 0.2 $\mu m$ filter before analysis.

| Treatment | Before Exposure | | | After Exposure | | |
| --- | --- | --- | --- | --- | --- | --- |
| | Si ($\mu M$) | Al ($\mu M$) | Si/Al | Si ($\mu M$) | Al ($\mu M$) | Si/Al |
| A | 254.1 | 21.7 | 11.7 | 246.8 | 20.8 | 11.9 |
| B | 283.8 | 21.0 | 13.5 | 274.6 | 20.3 | 13.5 |
| C | 324.0 | 21.0 | 15.4 | 303.4 | 20.2 | 15.0 |
| D | 340.5 | 340.5 | 16.5 | 336.8 | 19.8 | 17.0 |
| E | 3.8 | 20.0 | 0.2 | 2.8 | 19.4 | 0.1 |

-continued

| | Before Exposure | | | After Exposure | | |
|---|---|---|---|---|---|---|
| Treatment | Si (μM) | Al (μM) | Si/Al | Si (μM) | Al (μM) | Si/Al |
| F | 498.2 | 1.0 | 498.2 | 475.8 | 0.9 | 528.7 |
| G | 522.1 | 1.1 | 474.6 | 508.4 | 1.0 | 508.4 |
| H | 503.9 | 20.3 | 24.8 | 496.8 | 19.1 | 26.0 |
| I | 507.2 | 20.2 | 25.1 | 488.4 | 19.2 | 25.4 |

It is apparent from these results that the dissolved silicon content from the compounds A to D fell short of the target 500 μm/liter, but the effect on fish mortality was nevertheless significant.

The results of fish mortality show that dissolved aluminium at the level of 20 micromoles per liter killed all the fish in a period of 24 hours while the dissolution of silicon and alkali in the water essentially eliminates aluminium toxicity of the silicon/aluminium ratio exceeds about 10.

Histology carried out on a 3 fish from each tank showed no significant amount of aluminium on gill tissue, except for traces in a small number of fish exposed to Ordinary Portland cement.

Tissue digestion of 3 fish from each tank showed total aluminium levels as follows:

| | |
|---|---|
| Water alone, and Water/Si | 1-2 μg/g Al |
| 20 μM Aluminium alone | 10 μg/g Al |
| 20 μM Aluminium plus 500 μM Si | 1.5-2 μg/g Al |
| 20 μM Aluminium plus Compounds A to D | 2-3 μg/g Al |

This example 8 demonstrates that treatments A to D are effective in eliminating aluminium toxicity in acidic waters through the dissolution of silicon compounds and alkali.

What is claimed is:

1. A process for the detoxification of rivers, lakes, and streams containing acidic water and dissolved aluminium at levels toxic to fish which comprises dissolving in the water a source of silicon and a source of alkali in amounts such that the water contains at least 40 micromoles per liter of dissolved silicon and the ratio of silicon to aluminium in the water is greater than 6:1 so that the aluminium is converted into a non-toxic silicate-aluminium complex which remains in solution in the water or precipitates out as colloidal solids to obtain aluminium detoxification.

2. A process as claimed in claim 1 wherein the amount of dissolved silicon in the water is at least 100 micromoles per liter.

3. A process as claimed in claim 1 or claim 2 wherein the ratio of silicon to aluminium in the water is greater than 10:1.

4. A process as claimed in claim 1 wherein a common source of silicon and alkali is used.

5. A process as claimed in claim 4 wherein the common source of silicon and alkali is a hydraulic calcium silicate.

6. A process as claimed in claim 5 wherein the hydraulic calcium silicate is a cement clinker.

7. A process as claimed in claim 5 wherein the hydraulic calcium silicate is Portland cement.

8. A process as claimed in claim 5 wherein a setting inhibiting additive is mixed with the hydraulic calcium silicate.

9. A process as claimed in claim 8 wherein the additive is a sugar.

10. A process as claimed in claim 4 wherein an additional source of silicon is used.

* * * * *

UNITED STATES PATENT AND TRADEMARK OFFICE
CERTIFICATE OF CORRECTION

PATENT NO. : 5,236,599
DATED : August 17, 1993
INVENTOR(S) : James D. BIRCHALL; Michael J. WALKER It is certified that error appears in the above-indentified patent and that said Letters Patent is hereby corrected as shown below:

On the title page, change item [73] Assignee, from "Imperial Chemical Industries, PLC, London England" to --Buxton Lime Industries Limited, Derbyshire, England--.

Signed and Sealed this

Thirtieth Day of August, 1994

Attest:

BRUCE LEHMAN

Attesting Officer

Commissioner of Patents and Trademarks